(12) United States Patent
Moore, III et al.

(10) Patent No.: US 8,039,078 B2
(45) Date of Patent: Oct. 18, 2011

(54) ENERGY-ABSORBING PADS

(75) Inventors: Dan T. Moore, III, Cleveland Heights, OH (US); Kathleen M. Novak, Cleveland, OH (US)

(73) Assignee: Intellectual Property Holdings, LLC, Cleveland, OH (US)

( * ) Notice: Subject to any disclaimer, the term of this patent is extended or adjusted under 35 U.S.C. 154(b) by 0 days.

(21) Appl. No.: 11/211,315

(22) Filed: Aug. 25, 2005

(65) Prior Publication Data

US 2007/0281125 A1      Dec. 6, 2007

Related U.S. Application Data

(60) Provisional application No. 60/604,607, filed on Aug. 26, 2004.

(51) Int. Cl.
*B32B 3/00* (2006.01)
(52) U.S. Cl. ............... 428/76; 2/412; 2/418; 428/67; 428/68; 428/71; 428/98; 428/138; 428/304.4; 428/411.1
(58) Field of Classification Search ............ 428/98, 428/221, 411.1, 68, 76, 71, 304.4–319.9, 428/131–138, 212–220, 357, 67; 36/28; 2/412, 418
See application file for complete search history.

(56) References Cited

U.S. PATENT DOCUMENTS

| | | | |
|---|---|---|---|
| 3,366,971 A | 2/1968 | Scherz | |
| 3,500,472 A | 3/1970 | Castellani | |
| 3,507,727 A | 4/1970 | Marshack | |
| 3,668,056 A * | 6/1972 | Hayes, Jr. | 442/76 |
| 3,716,614 A * | 2/1973 | Okamoto et al. | 264/49 |
| 3,844,862 A | 10/1974 | Sauer et al. | |
| 3,882,547 A | 5/1975 | Morgan | |
| 3,994,020 A | 11/1976 | Villari | |
| 4,029,534 A | 6/1977 | Bocks et al. | |
| 4,044,399 A | 8/1977 | Morton | |
| 4,075,717 A | 2/1978 | Lemelson | |
| 4,101,983 A | 7/1978 | Dera et al. | |
| 4,114,197 A | 9/1978 | Morton | |
| 4,279,038 A | 7/1981 | Bruckner et al. | |
| 4,338,371 A | 7/1982 | Dawn et al. | |
| 4,345,338 A | 8/1982 | Frieder, Jr. et al. | |

(Continued)

FOREIGN PATENT DOCUMENTS

FR      2717659 A1      9/1995

(Continued)

OTHER PUBLICATIONS

Article from www.polytechinc.com, "Specialty Foams and Composites," 1 page.

(Continued)

*Primary Examiner* — Brent O'Hern
(74) *Attorney, Agent, or Firm* — Pearne & Gordon LLP (57) ABSTRACT

An energy-absorbing pad structure includes an energy-absorbing pad that is encapsulated by a polymeric film. The polymeric film is sufficiently air-permeable to permit air to escape during rapid compression of the pad structure, such as from a high-speed dynamic impact, but nonetheless is water resistant under ordinary conditions. It is desirable that the polymeric film is made from an elastic polymer. The air-permeability can be provided from a series of perforations such that the film's elastic quality tends to contract the perforations thereby impeding the progress of water through them under normal conditions. The energy-absorbing pad can be a semi-rigid viscoelastic foam.

30 Claims, 3 Drawing Sheets

U.S. PATENT DOCUMENTS

| | | | |
|---|---|---|---|
| 4,513,449 A | 4/1985 | Donzis | |
| 4,558,470 A | 12/1985 | Mitchell et al. | |
| 4,566,137 A | 1/1986 | Gooding | |
| 4,627,114 A | 12/1986 | Mitchell | |
| 4,695,496 A | 9/1987 | Lee | |
| 4,700,403 A | 10/1987 | Vacanti | |
| 4,808,469 A | 2/1989 | Hiles | |
| 4,842,931 A | 6/1989 | Zook | |
| 4,845,786 A | 7/1989 | Chiarella | |
| 4,872,220 A | 10/1989 | Haruvy et al. | |
| 4,916,759 A | 4/1990 | Arai | |
| 4,923,650 A * | 5/1990 | Antoon et al. | 264/41 |
| D310,893 S | 9/1990 | Broersma | |
| 5,014,691 A | 5/1991 | Cueman et al. | |
| 5,025,504 A | 6/1991 | Benston et al. | |
| 5,027,803 A | 7/1991 | Scholz et al. | |
| 5,056,162 A | 10/1991 | Tirums | |
| 5,083,361 A | 1/1992 | Rudy | |
| 5,086,033 A * | 2/1992 | Armor et al. | 502/432 |
| 5,263,203 A | 11/1993 | Kraemer et al. | |
| 5,271,103 A | 12/1993 | Darnell | |
| 5,274,846 A | 1/1994 | Kolsky | |
| 5,324,460 A | 6/1994 | Briggs | |
| 5,330,249 A | 7/1994 | Weber et al. | |
| 5,376,318 A | 12/1994 | Ho | |
| 5,421,035 A | 6/1995 | Klose | |
| 5,423,087 A | 6/1995 | Krent et al. | |
| 5,439,733 A | 8/1995 | Paire | |
| D364,487 S | 11/1995 | Tutton et al. | |
| 5,543,194 A | 8/1996 | Rudy | |
| 5,581,818 A | 12/1996 | Lorenzi et al. | |
| 5,591,379 A * | 1/1997 | Shores | 252/194 |
| 5,598,588 A | 2/1997 | Lee | |
| 5,611,153 A | 3/1997 | Fisher et al. | |
| 5,655,226 A | 8/1997 | Williams | |
| 5,669,079 A | 9/1997 | Morgan | |
| 5,734,994 A | 4/1998 | Rogers | |
| 5,741,568 A | 4/1998 | Rudy | |
| 5,766,704 A * | 6/1998 | Allen et al. | 428/34.1 |
| 5,891,372 A | 4/1999 | Besset et al. | |
| 5,913,412 A | 6/1999 | Huber et al. | |
| 5,946,734 A | 9/1999 | Vogan | |
| 5,950,244 A | 9/1999 | Fournier et al. | |
| 5,992,054 A * | 11/1999 | Rauch | 36/30 R |
| 6,028,017 A * | 2/2000 | Curtin et al. | 442/370 |
| 6,051,624 A | 4/2000 | Bastin et al. | |
| 6,070,271 A | 6/2000 | Williams | |
| 6,093,468 A * | 7/2000 | Toms et al. | 428/67 |
| 6,105,162 A | 8/2000 | Douglas et al. | |
| 6,105,176 A | 8/2000 | Egger | |
| 6,108,825 A | 8/2000 | Bell et al. | |
| 6,154,889 A | 12/2000 | Moore, III et al. | |
| 6,298,497 B1 | 10/2001 | Chartrand | |
| 6,326,077 B1 | 12/2001 | Monaci | |
| 6,351,854 B1 | 3/2002 | Whalen et al. | |
| 6,381,759 B1 | 5/2002 | Katz | |
| 6,383,431 B1 * | 5/2002 | Dobrin et al. | 264/154 |
| 6,391,935 B1 | 5/2002 | Hager et al. | |
| 6,425,141 B1 | 7/2002 | Ewing et al. | |
| 6,434,755 B1 | 8/2002 | Halstead et al. | |
| 6,446,270 B1 | 9/2002 | Durr | |
| 6,453,476 B1 | 9/2002 | Moore, III et al. | |
| 6,467,099 B2 | 10/2002 | Dennis et al. | |
| 6,485,446 B1 * | 11/2002 | Brother et al. | 602/20 |
| D475,486 S | 6/2003 | Ide et al. | |
| 6,604,246 B1 | 8/2003 | Obreja | |
| 6,634,045 B1 * | 10/2003 | DuDonis et al. | 5/648 |
| 6,658,671 B1 | 12/2003 | Von Holst et al. | |
| 6,671,889 B2 | 1/2004 | Dennis et al. | |
| 6,681,409 B2 | 1/2004 | Dennis et al. | |
| 6,803,005 B2 | 10/2004 | Dennis et al. | |
| 7,299,505 B2 | 11/2007 | Dennis et al. | |
| 7,316,036 B2 | 1/2008 | Rudolf et al. | |
| 7,341,776 B1 | 3/2008 | Milliren et al. | |
| 2002/0002730 A1 * | 1/2002 | Dennis et al. | 2/411 |
| 2002/0152542 A1 | 10/2002 | Dennis et al. | |
| 2002/0168496 A1 | 11/2002 | Morimoto et al. | |
| 2004/0199981 A1 | 10/2004 | Tucker | |
| 2004/0200094 A1 * | 10/2004 | Baychar | 36/55 |
| 2005/0166302 A1 | 8/2005 | Dennis et al. | |

FOREIGN PATENT DOCUMENTS

| | | |
|---|---|---|
| SU | 659134 | 4/1979 |
| WO | 9105489 A1 | 2/1991 |

OTHER PUBLICATIONS

Newsletter "In-Touch: Information on Flexible Polyurethane Foam" from the Polyurethane Foam Association, vol. 11, No. 1, Jun. 2003, 7 pages.

English Language Abstract of FR 2717659, Nieddu Pietro, Sep. 9, 1995.

Google translation of FR 2717659.

PCT Application for Viscoelastic Foam Layer and Composition, Application No. PCT/US2004/034596, Filing Date Oct. 19, 2004.

Prosecution history for U.S Patent No. 7,341,776, on Jul. 25, 2008.

* cited by examiner

ENERGY-ABSORBING PADS

This application claims the benefit of U.S. Provisional Patent Application Ser. No. 60/604,607 filed Aug. 26, 2004, the contents of which are incorporated herein by reference in their entirety.

FIELD OF THE INVENTION

The invention relates generally to an energy-absorbing pad that is encapsulated by a sealed film, and more particularly to a viscoelastic energy-absorbing foam pad encapsulated by a perforated polymer film.

DESCRIPTION OF RELATED ART

Polymeric protective foams (e.g. protective foam layers) are widely used for impact force attenuation in a variety of safety-related applications. These include sport applications, military combat applications, automotive applications, footwear applications, etc. In general, a protective foam layer is placed adjacent or against a part of a person's body to protect a body part (e.g. a head) during an impact.

Protective foams function by absorbing and/or dissipating the impact energy from the force of an impact. An energy absorbing foam deforms or crushes on impact thereby consuming a portion of the impact energy to prevent its reaching the underlying body part. An energy dissipating foam also spreads the impact force over a larger surface area than the actual area of impact so the force per unit area is decreased for the underlying body part compared to that for the initial impact surface (e.g. the outer surface of the protective layer or a hard outer shell over the protective layer).

Traditionally, rigid foam pads are used in safety-related applications, made from foams that are non-recovering (i.e., they do not recover or rebound to any significant degree once they have been crushed) and do not provide comfort to the user. Such foams are not viscoelastic, and their structure essentially is destroyed on impact. Therefore, it is desirable to use semi-rigid protective foam pads that provide both comfort and energy-absorbing capabilities, and which are viscoelastic and recover (i.e. they re-expand to their pre-impacted shape) after impact.

Current energy-absorbing pads used in combat helmets can be made, e.g., by encapsulating an acceleration rate sensitive material with a non-porous coating that traps air and to a degree prevents compression of the coated foam. Such a design is the subject of U.S. Pat. No. 6,467,099. However, this structure has several significant disadvantages. First, the coating material used to cover the pads is both expensive and difficult to apply. In order for the pad to effectively attenuate an impact force, the coating must remain substantially continuous, non-porous and free from perforation. This can be difficult to guarantee, especially during combat conditions when repeated impacts may be likely. Second, the coating is often a sprayed on solvent-based material, as in the preferred embodiment of U.S. Pat. No. 6,467,099, which provides minimal resistance to chemicals and solvent-based products, such as insect repellants, acetone, etc. that may be encountered in the field. Third, the process of applying such a solvent-based coating involves specialized equipment to capture the solvent vapors released when the coating is dried.

SUMMARY OF THE INVENTION

An energy-absorbing pad structure is provided, which has an energy-absorbing viscoelastic foam pad and a perforated polymeric film encapsulating the foam pad. The perforated polymeric film is resistant to water penetration.

An energy-absorbing pad structure also is provided, which has an energy-absorbing viscoelastic foam pad and a polymeric film layer encapsulating the foam pad. The polymeric film layer is resistant to water penetration but sufficiently air permeable to permit air that is expelled from the foam pad on rapid compression thereof to escape through the polymeric film layer to the ambient atmosphere.

DETAILED DESCRIPTION OF PREFERRED EMBODIMENTS OF THE INVENTION

In the description that follows, when a preferred range such as 5 to 25 (or 5-25) is given, this means preferably at least 5 and, separately and independently, preferably not more than 25.

Figure 1:
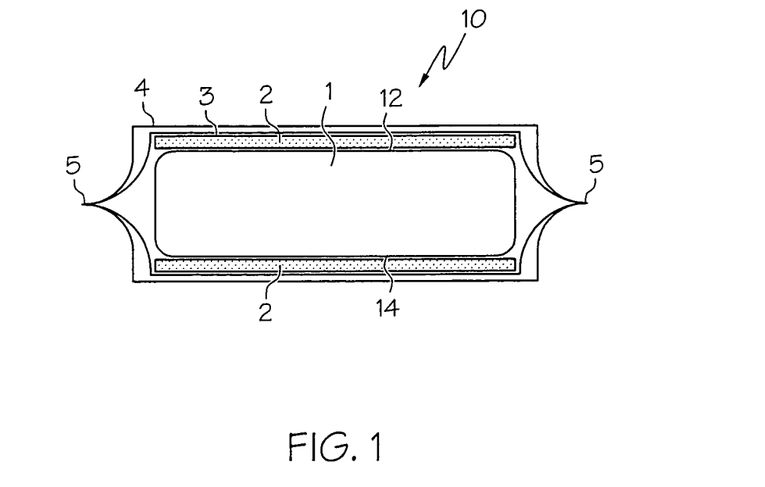
FIG. 1 illustrates a cross-sectional view of an energy-absorbing pad structure 10 as herein described.

With reference to FIG. 1, there is shown an embodiment of a pad structure 10 contemplated herein. A polymeric film 3 encapsulates an energy-absorbing pad 1, and a textile covering 4 encapsulates the energy-absorbing pad 1 and the polymeric film 3. As more fully described below the polymeric film 3 generally is provided as two opposing sheets or portions of film that are joined together around the perimeter of the pad 1 at seam 5, as seen more clearly in FIG. 2. The textile covering 4 likewise can be provided as two opposing sheets or portions that are joined together around the perimeter of the pad 1 as shown. An intermediate adhesive (shown schematically as layer 2, which has been exaggerated in the figures for clarity) can be applied to the surface of the pad 1 to adhere the polymeric film 3 to the pad 1. Alternatively, the polymeric film 3 can be adhered to the foam pad 1 without an adhesive, e.g. via heat bonding the polymeric film 3 to the pad 1 as further explained below. It is understood that the arrangement shown in FIG. 1 can include additional materials or layers arranged intermediate or adjacent the layers or components thereof, e.g. between polymeric film 3 and textile covering 4.

To facilitate the following description, there is defined a top surface 12 of the energy absorbing pad 1, and a bottom surface 14 thereof. It is to be understood that there is not, necessarily, any physical difference between the opposite surfaces 12 and 14, as the pad can be made from a foam of substantially uniform composition. Rather, the distinction is made herein merely to aid the following description, where the top surface 12 in use will face away from the body part being protected (a head), and the bottom surface 14 will face toward the body part being protected. Also as referenced herein, the opposing sheets or portions of the polymeric film 3 and of the textile covering 4 sometimes are referred to, respectively, as top and bottom portions similarly as above depending on whether they are provided adjacent the top or bottom surface 12 or 14 of the pad 1. Each of the materials and components described above and shown in FIG. 1, as well as methods for providing and assembling them to provide the pad structure 10 shall now be described.

The energy-absorbing pad 1 is a structure that can be placed over a body part in order to provide protection from an impact. One application of particular utility is to provide the pad structure 10 inside the outer shell of a sports or combat helmet in order to provide protection to the wearer's head from a dynamic or ballistic impact to the helmet shell. It is desirable that the pad 1 is compressible on impact to dissipate or consume at least a portion of the impact force. It is also desirable that the pad 1 be lightweight. Advantageously, the energy-absorbing pad 1 is made from foam, preferably a viscoelastic foam, and even more preferably a semi-rigid viscoelastic foam such as is disclosed in Published PCT patent application No. PCT/US2004/034596 (published as WO 2005/042611), which is incorporated herein by reference in its entirety. In one embodiment, the pad 1 can be made from a number of discrete foam layers wherein individual layers of foam are joined or otherwise laminated together to form the pad 1. The individual foam layers can be made from different foams, and there can be 2, 3, 4, or more foam layers in the construction of the foam pad 1. In one desirable embodiment, the pad 1 is made as a two-layer structure having a layer of high-modulus foam glued or joined to another layer of relatively low-modulus foam.

Foams are lightweight and typically are compressible on impact, capable to absorb or dissipate at least a portion of the impact energy commensurate with the particular foam's rigidity and viscoelasticity. Additionally, in their uncompressed state, foams have a significant proportion of their volume composed of air, which occupies the cellular structure of the foam. The air within the foam provides an additional mode of energy absorption on impact based on the gas compressibility of air. Foams can be designed to be either open-celled or closed-celled in order to take advantage of different aspects of foam rigidity versus air permeability and entrapment within the cell structure to achieve different mechanisms of impact force attenuation as is understood in the art. The semi-rigid viscoelastic foam which is preferred for the energy-absorbing pad 1, e.g. as disclosed in Publication No. WO 2005/042611, can provide significant protection against dynamic impacts, such as from a ballistic impact against the outer shell of the helmet or other protective gear incorporating the pad structure 10, when situated between the outer shell and the wearer.

For example, a semi-rigid viscoelastic polyurethane foam that is made from a significant proportion of propylene oxide-extended amine-based polyether polyols which contain substantially no ethylene oxide extension units, together with other filled and/or unfilled polyether polyol(s) as described in the aforementioned publication, as well as isocyanate (index 60-130) and appropriate catalysts, provides significant high speed dynamic impact protection to a significant degree comparable to rigid foams (e.g. expanded polystyrene). But such a foam nevertheless can be nondestructively deflected and will recover at a delayed rate following such deflection commensurate with the foam's viscoelasticity (its hysteresis function). This is unlike conventional rigid foams such as expanded polystyrene, which can provide adequate protection against high speed impacts, but which are destructively crushed and cannot recover or be reused. In addition, being a semi-rigid foam and not a rigid foam, the preferred foam for the pad 1 also provides a measure of protection against low-speed or even static or quasi-static impact forces, which cannot be matched by rigid foams such as expanded polystyrene.

More specific details for such semi-rigid viscoelastic foams are provided in Publication WO 2005/042611, incorporated herein.

Alternatively, the energy-absorbing pad 1 can be comprised of a multi-impact closed-cell foam such as closed-cell polyethylene foam, Insulate™ foam, plasticized closed-cell vinyl foam, closed-cell polypropylene foam, etc. These closed-cell foams are generally made in slab form and are blown or expanded into foam by an autoclave or extruder. In a further alternative, the energy absorbing pad 1 can be provided from any suitable material or foam that is known or conventional in the art for providing dynamic impact protection, although it is desirable that the material for pad 1 not be a rigid foam such as expanded polystyrene that will not recover following destructive deflection or "crush" on impact.

The shape of the energy-absorbing pad 1 will depend on the particular application and may be, e.g., a rectangle, circle, trapezoid, etc., comprising a thickness of typically about or less than 2 inches for most body protecting applications. It is desirable that the shape of the pad 1 fit easily into a protective shell such as a helmet shell or other shell used in the various applications discussed below. In one embodiment, the pad 1 is approximately 3⅜ inches in length, 2 inches in width and ¾ of an inch in thickness. However, it is understood that the pad 1 can be any shape and should not be limited to the applications discussed herein.

The energy-absorbing pad 1 is capable of absorbing and/or dissipating at least a portion of the energy of an impact. As noted above, a semi-rigid viscoelastic foam, desirably used for the pad 1, will provide significant protection against a high speed dynamic impact due to its substantial rigidity, but it also will recover and retain its rigidity following such impact so it may be reused. The compression and hysteretic (due to its viscoelastic structure) characteristics of such a foam dampen and disperse the force of a high-speed impact. The ability of pad 1 to recover after impact also gives it long-term use and durability, which is desired in athletic and combat equipment.

A viscoelastic foam used for the pad 1 desirably will recover within the following guidelines following the referenced degree of compression: The time for the energy-absorbing pad 1 to substantially recover from a compression of 50% its original height is in the range of 3 seconds to 120 seconds. Substantial recovery of the energy-absorbing pad means recovery to at least 85, preferably 90, preferably 95, percent of the initial pre-compressed height following compression thereof. Further, it is desirable the pad 1 can recover from such a 50% compression to 80% of its pre-compressed height in the range of 2 seconds to 60 seconds, preferably 3 seconds to 30 seconds, and more preferably about 3 seconds to about 20 seconds. Following a 75% compression from its original height, the pad 1 should substantially recover in the range of 4 seconds to 240 seconds, and should recover to 80% of its pre-compressed height in the range of 3 seconds to 120 seconds, preferably 3 seconds to 90 seconds, and more preferably about 3 seconds to about 60 seconds.

The polymeric film 3 can be an elastic and flexible film as known in the art, preferably that is capable of being fused or fusion bonded to form the seam 5 as described below. The polymeric film 3 can be any conventional or known polymeric film, such as a polyolefin film (e.g. polyethylene and/or polypropylene), polystyrene, polyester, urethane, polyurethane, aliphatic polyurethane, etc. The polymeric film 3 can also be made from any of the other well-known natural polymers such as cellulosic materials and/or other biopolymers (e.g. polylactic acid).

Suitable film materials are available from Deerfield Urethane, Inc., South Deerfield, Mass., as Dureflex™ PT 9400S or Dureflex™ PT 6100S, which are flexible and elastic polyurethane films. These products are proprietary polyurethane films that have tear resistance greater than 500 pli, tensile strengths greater than 8000 psi and ultimate elongations greater than 500%. Other flexible polyurethane films also may be suitable for the polymeric film 3 herein, e.g., other polyurethane films available from Deerfield Urethane, Inc., Stevens Urethane, Easthampton, Mass., or from other commercial sources.

As noted above, Dureflex™ PT 9400S and Dureflex™ PT6100S are proprietary compositions. The major component of these films is a polyurethane polyether elastomer.

The polymeric film 3 encapsulates the energy-absorbing pad 1 to provide a durable, water and chemical resistant barrier around the pad 1. The polymeric film 3 prevents or substantially impedes the flow of liquids such as water to prevent or impede them from absorbing or penetrating into the energy-absorbing pad 1. For example, the polymeric film 3 shields the pad 1 from the wearer and thereby prevents the pad 1 from absorbing the perspiration generated by him/her, which otherwise may be absorbed by the pad 1, particularly if the pad is made from a cellular material such as foam. A pad 1 that has been saturated with water or perspiration is undesirable to a user because of the increased weight of the pad 1 and the overall reduction in comfort to the wearer. In addition, moisture in the pad 1 may adversely affect the pad's ability to absorb and/or dissipate energy from the force of an impact. For example, in the case of a viscoelastic foam the presence of moisture may alter the hysteresis function for the foam causing it to dissipate energy differently or to a different or lesser extent than the dry foam.

In addition to providing a barrier that is resistant to water penetration, it is desirable that the polymeric film 3 also provides means for the discharge of air that is expelled from the foam's cellular structure upon an impact-induced compression of the foam pad 1. That is, the polymeric film 3 should be resistant to water penetration under ordinary conditions, but be or become sufficiently air permeable on a dynamic or ballistic impact or similar compression event to permit air expelled from the foam pad's cellular structure on compression thereof to escape the polymeric film 3. Otherwise, excess ballooning of the polymer film 3 also may adversely affect the energy-absorbing impact attenuation characteristics of pad 1. To provide the desired air permeability, the polymeric film 3 is perforated to provide a passage or passages through the film 3 for air that is expelled from the energy-absorbing pad 1 on impact to escape. The perforations (shown schematically at 8) also allow the passage of air from the outside environment back into the pad 1 so the pad 1 can recover (i.e. expand or decompress to its original pre-impact shape) after the impact load is removed. Advantageously, the perforations 8 are designed so that they do not permit liquids such as water to penetrate the film 3 from the outside environment under normal conditions.

It is also desirable that the perforations 8 provide some measure of air permeability through the film 3 even under non-impact conditions, such as due to changes in the ambient air pressure as may be encountered when climbing or descending in an airplane. Otherwise, if air were not permitted to escape the pad structure 10 through the perforations 8, the film 3 would tend to balloon on climbing as the ambient pressure decreased (or to shrink on descending as ambient pressure increased) in order to maintain constant pressure across the film 3. Because air is significantly less dense than water, the perforations 8 inherently will permit air to flow therethrough to a significantly greater degree than water, which in part is how the perforations present a desired degree of air permeability but nevertheless are able to maintain adequate water-penetration resistance. Thus, it will be recognized that while sufficiently small perforations can be provided through the film 3 so as to substantially inhibit or prevent the passage of water under normal conditions, they advantageously will permit the passage of air in response to a pressure gradient across the film 3.

The substantially water-impermeable but air-permeable (at least during an impact) behavior of the perforations 8 provided in the polymeric film 3 can be understood and provided as follows. When very small perforations are made, e.g. using a needle point of very small diameter such as around 0.005 inches, the resulting perforations 8 are very small. The elastic character of the film 3 also will prevent expansion of the perforations 8 sufficiently so they do not substantially admit droplets of water, at least not from incidental water contact such as rain, and even under modest or moderate conditions of hydrostatic pressure, such as immersion within six inches or one foot of water, or more. However, on a dynamic compression event such as from a ballistic impact, the air expelled from the encapsulated foam pad 3 induces a pressure gradient across the film 3 relative to ambient atmospheric pressure, such that the perforations 8 expand against the elastic tendency of the film 3 to permit the air to escape, thus equalizing the pressure across the film 3. Once the impact load has been removed, the foam pad 1 will tend to return to its pre-compression shape based on its own viscoelastic character, thus generating a pressure gradient in the opposite direction across the film 3 to draw air back into the foam's cellular structure as it is re-expanding. Thus the foam's own tendency to re-expand induces a pressure gradient across the film 3 sufficient to draw air back in and re-fill the foam's cellular structure of air.

Without perforations, the polymeric film 3 still may exhibit a measure of inherent gas (i.e. air) permeability based the material's porosity, but not enough to permit sufficient air passage through the film on rapid compression of the pad to avoid splitting the sealed seam 5 (discussed below) between the opposing sheets or portions of the polymeric film 3. (It should be evident that the inherent gas-permeability of a polymeric film, as a material property based on the film's porosity, is not the air-permeability that is referred to herein; air-permeability herein refers to a substantial measure of air penetrability through a polymeric film 3 resulting from perforations 8). Furthermore, even if the seam 5 held, the rate of gas diffusion through the non-perforated polymeric film 3 would be so minimal that air expelled from the energy-absorbing pad 1 on rapid compression would be largely trapped by the film 3 causing it to balloon, and may prevent suitable physical compression or deformation of the pad 1 thus impeding or counteracting the pad's 1 energy-absorptive function. As a result, the desirable viscoelastic characteristics of the energy-absorbing pad 1 may be largely negated because of the trapped air in the non-perforated polymeric film 3.

The perforations can be made with a needle point, preferably having a beveled point or end. The diameter of the needle point that penetrates the film 3 should be 0.001" to 0.01", preferably about 0.003" to about 0.008" and more preferably about 0.005". The perforations can be made by passing the needle from the outside surface of the polymeric film 3 through the film 3 towards the pad 1. In this embodiment, the film 3 can be assembled to the pad 1 and then perforated, wherein the needle point(s) may extend somewhat into the underlying foam pad to a small degree before being withdrawn. This should not adversely affect the pad's function or structure. Otherwise, the perforations can be made by passing the needle from the pad 1 side of the polymeric film 3 through the film towards the outside, which would require the film 3 to be perforated prior to being assembled to the pad 1.

It is preferred that the number of perforations in the polymeric film 3 is sufficient to allow the discharge of air upon a high speed impact as described above. The perforations are preferably spaced apart in order to form a grid pattern or array of perforations in the polymeric film 3. Accordingly, it is preferred that the spacing between adjacent perforations is in the range of 0.05-1, preferably 0.05-0.5, preferably 0.1-0.25, inches, and that the perforations are provided in a regular array of uniformly spaced perforations. To provide such an array of perforations, a corresponding array of needle points can be provided in a jig that is then pressed against the surface of the polymeric film 3 at an appropriate location such that the needle points are caused to penetrate the film 3 to provide the perforations. To further ensure that the elastic tendency of the film 3 will tend to hold the perforations closed against water penetration under ordinary conditions, it may be desirable to stretch the polymeric film 3 a small degree, such as at least or about 1, 2, 3, 4, or 5, percent, or greater (such as at least 10, 15 or 20 percent), so that the film is in a stretched condition when the perforations are made. Then, following perforation of the film 3 it is allowed to relax back to its original un-stretched condition, and is provided to encapsulate the foam pad 1 in its un-stretched condition. As a result, the elasticity of the polymeric film 3 will strongly tend to contract the perforations under normal conditions, and even against a modest or potentially a moderate pressure gradient. However, on rapid or ballistic compression of the foam pad 1 encapsulated within the polymeric film 3, air is expelled from the foam at a sufficient rate so that the resulting pressure gradient counteracts the contractile tendency of the film 3 so that the air can escape through the perforations.

In one embodiment, only the top portion of the encapsulating polymeric film 3 (facing away from the user's body in use) is perforated. Alternatively, both the top and bottom portions can be perforated, or only the bottom portion.

In a further embodiment, the top and/or bottom portion(s) of the polymeric film 3 can consist of one ply or of multiple plies of polymeric film material. For example, the top portion of the polymeric film, overlying the entire top surface 12 of the energy-absorbing pad 1, can be one or more plies of polymeric film material. The bottom portion of the film 3 overlying the entire bottom surface 14 also can be similarly provided having one or more plies of polymeric film material. Multiple plies of polymeric film material can be used to achieve an overall thickness for the polymeric film 3 that is desired in a given application, and/or to control or regulate the rate of air expulsion from a dynamic impact event based on empirical testing. For example, the top portion of the polymeric film 3 can include a plurality of plies or layers of polymeric material, while the bottom portion of the polymeric film is provided having only one layer or ply. In this embodiment, it is desirable that only the top portion (consisting of a plurality, such as three, plies) be perforated, while the single-ply bottom portion of the polymeric film 3 remains non-perforated.

The thickness of the top portion of the polymeric film 3 can be made greater than that of the bottom portion thereof, either by using more plies for the top portion as described above, or by using a thicker film for the top portion than for the bottom portion. In one embodiment, the top portion of the polymeric film 3 has a thickness in the range of 2 mils to 15 mils, preferably from 2 mils to 10 mils, and more preferably from about 2 mils to about 5 mils, and the bottom portion has a thickness in the range of 1 mils to 15 mils, preferably from 1 mils to 10 mils, and more preferably from about 1 mils to about 5 mils.

Optionally an intermediate adhesive layer 2 (shown exaggerated in the figures) can be applied to the surfaces 12 and/or 14 of the pad 1 to adhere the opposing portions or sheets of the encapsulating polymeric film 3 thereto. The adhesive layer 2 is applied to the surface of the energy-absorbing pad 1, and adheres the polymeric film 3 to the pad 1 thereby helping to prevent the polymeric film 3 from crinkling, shifting or sliding over the surface of the pad 1 during use. The intermediate adhesive layer 2 can comprise, but is not limited to, an adhesive paste or cement, adhesive fusible webbing or a no-sew bond fabric as known in the textile and crafts arts. If it is a webbing or bond fabric, the intermediate adhesive layer 2 can be attached or held onto the surface of the energy-absorbing pad 1 by a semi-liquid or a gel material, Vaseline, grease, oil or glycerin, prior to affixing the polymeric film 3 sheet. In the alternative, the intermediate adhesive layer 2 can directly overlie the surface of the energy-absorbing pad 1 without an intermediate semi-liquid or gel. Furthermore, the intermediate adhesive layer 2 can be applied to the surface of the energy-absorbing pad 1 by any conventional method known in the art.

In a further embodiment, the polymeric film 3 can be adhered directly to the surface of the pad 1 via heat bonding, with no intermediate adhesive layer. In this method, the polymeric film 3 (such as a polyurethane film) is heated to just above its softening point (or melting point) and brought into contact with the surface of the foam pad 1 before it is then allowed to cool back down to ambient temperature. The result is that the polymeric film 3 is heat-bonded to the surface of the foam pad 1 by being melded thereto in the softened or partially melted state before being cooled to re-solidify the film 3. Methods for heat-bonding polymeric films to various substrates are known in the art, and will not be further described here.

The textile covering 4 also can be considered optional. This covering 4 is provided to encapsulate the polymeric film 3 and provide comfort to the wearer, as well as in some applications a means for securing the pad structure 10 to the inner surface of an outer shell for protective gear. For example, at least the top portion of the textile covering 4 can be provided as a high-pile fabric that can be secured to the inner surface of a protective shell, such as a helmet or kneepad shell, via a hook-and-pile fastener mechanism such as Velcro. In addition, the bottom portion of the textile covering 4 can be provided from a sewn or porous fabric material that is effective to absorb and wick moisture, such as perspiration, away from the wearer's underlying body part that may be in contact with the bottom portion of the textile covering 4 during use.

In one desirable embodiment, the bottom portion of the textile covering 4 is composed of a material capable of wicking moisture away from a surface as described above, and the top portion of the textile covering 4 is a fabric of sufficient pile to be readily retained by "hook" fasteners extending from the surface to which the pad structure 10 is to be adhered, such as a pile fabric of a conventional Velcro or similar fastening system. For example, in this manner the pad structure 10 can be easily secured to the inside of a protective shell for a helmet where the "hook" fabric has been previously attached or adhered. The textile covering 4 can also be comprised of any fabric, woven material or textile material conventionally known in the art, and can be provided for any one or all of the foregoing purposes, in addition to any one or all of the following: aesthetic appearance, comfort, marketability or merchandisability, printability, etc.

It is preferred, though not required, that the textile covering 4 is not physically bonded to the polymeric film 3 over a significant portion of their respective surfaces in the pad structure 10. That is, the two materials 3, 4 are not laminated together. In the alternative, the polymeric film 3 can be laminated, e.g. by heat or flame techniques, to the textile covering 4.

Figure 2:
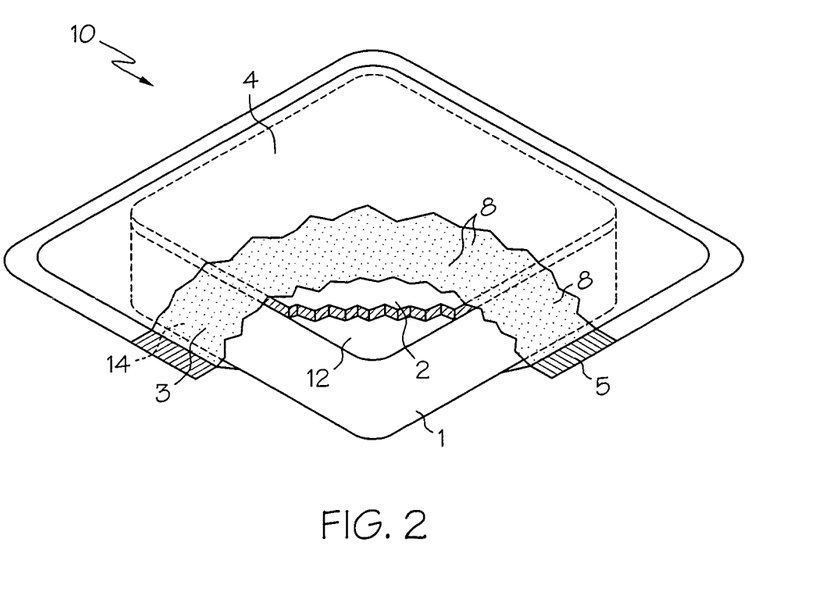
FIG. 2 shows a perspective view of the pad structure of FIG. 1, partially broken away to show the arrangement of layers thereof.

In the embodiment illustrated in FIG. 2, the polymeric film 3 is provided by joining top and bottom portions of polymeric film material around the perimeter of the energy-absorbing pad 1 to form a seam 5 therearound. Also in that embodiment, the top and bottom portions of the textile covering 4 also are joined together at the seam 5 to provide the illustrated structure, wherein the pad 1 is encapsulated within the polymeric film 3, which is encapsulated within the textile covering 4. This construction can be made as follows.

Figure 3A:
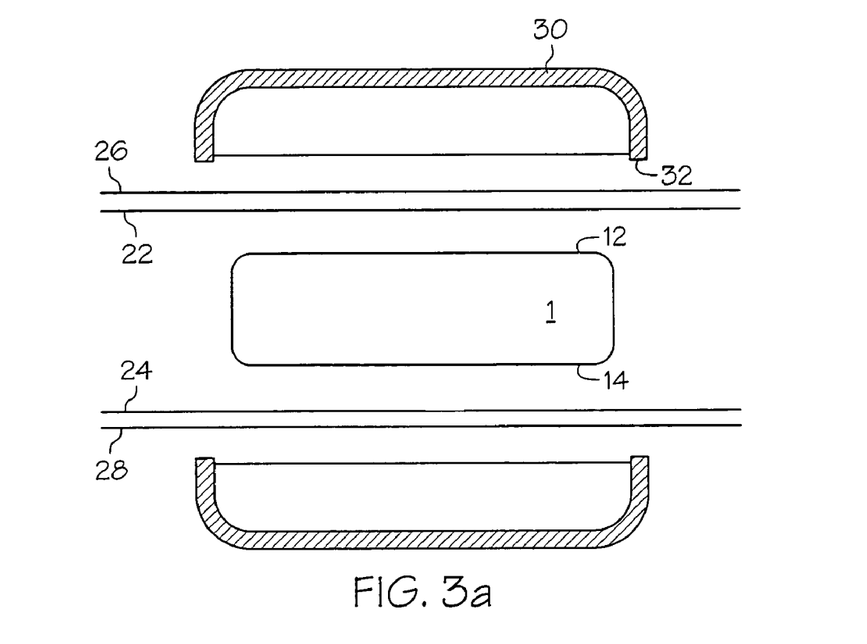
FIGS. 3a-3b show, schematically, a process for making the pad structure of FIG. 1.

A method for producing an energy absorbing pad structure 10 is illustrated schematically in FIG. 3. First referring to FIG. 3a, the energy-absorbing pad 1 is positioned having a first web of polymeric film material 22 overlying the top surface 12 and a second web of polymeric film material 24 underlying the bottom surface 14 of the pad 1. It is to be noted that reference here to "top" and "bottom" as well as "first" and "second" is merely for convenience; the pad 1 might just as easily be oriented vertically during assembly instead of horizontally as illustrated, in which case the first and second webs 22 and 24 might be referred to as "left" and "right," respectively. Continuing, a first textile material web 26 is positioned above the first polymeric film material web 22, opposite the pad 1, and a second textile material web 28 is positioned below the second polymeric film material web 24, opposite the pad 1.

A sealing die 30 is provided having opposed reciprocating members oppositely provided over and under, respectively, the first and second textile and polymeric webs (22-28) with the pad 1 located centrally in-between as shown. The reciprocating members have cooperating die-pressing faces 32 which are arranged such that when the reciprocating members are closed, the opposing faces 32 are pressed together along a pathway around the perimeter of the energy-absorbing pad 1 as seen in FIG. 3b.

When the members of the sealing die 30 are closed (FIG. 3b), the four webs (first and second polymeric film and textile webs 22-28) are pressed together along the pathway of the die-pressing surfaces 32. The die members are equipped to heat the portions of the webs in contact with the die-pressing surfaces 32 around the perimeter of the pad 1 such that polymeric material webs 22 and 24 are caused to at least partially soften or melt, thus being joined together to form the seam 5 shown in FIG. 2 and as will be understood by those of ordinary skill in the art. Simultaneously, the textile material webs 26 and 28, which are in contact with the softened/melted portions of the polymeric webs along the pathway of the contacting surfaces 32, are permeated with and absorb a portion of the polymeric material such that when that material re-hardens or solidifies, the effect is to join all four webs at the seam 5 as will be understood.

Figure 3B:
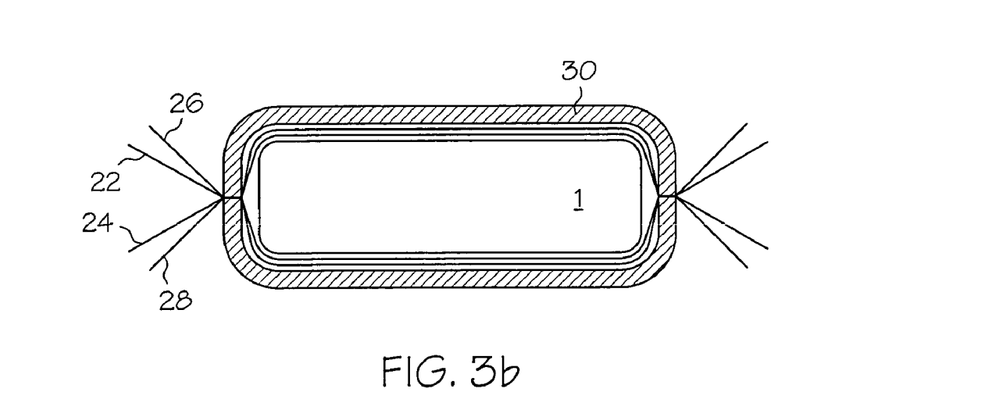

For convenience, the process of FIG. 3 is illustrated schematically only for a single pad 1. However, it will be understood to persons having ordinary skill in the art that a plurality, such as an array, of pads 1 could be arranged in a die having a cookie-cutter die-pressing surface 32 pattern designed to accommodate an array of pads 1. Subsequent to the heat-sealing step, the die members can be opened and the newly made pad structure 10 (or array of such structures 10) can be conveyed to a die-cutting station (not shown) where a cutting die can be used to free each pad structure 10 from the extraneous material webs by stamping.

In addition to heat-sealing using conventional heating methods, the energy to soften or melt the polymeric webs 22 and 24 can be supplied via a radio frequency method. In such a method, the reciprocating members of the die 30 are closed around the pad 1 along a pathway in contact with the material webs as before, and a radio frequency is applied to the die, thereby transmitting radio waves through the polymeric film material webs 22 and 24 as they are compressed together around the perimeter of the pad 1. The radio waves excite the molecules of the polymeric film sheets to generate sufficient heat to effectively soften or melt or seal (i.e. physically bond the layers together) the compressed polymeric film material webs together to form the polymeric film layer 3 around the pad 1. The methods and machinery for carrying out radio frequency sealing are known or conventional in the art. A person having ordinary skill in the art could make the selection of appropriate devices and radio frequencies for a particular polymeric film. In the alternative, other conventional heating methods can be used for applying heat to the polymeric sheets compressed in the die.

In a further alternative embodiment (not illustrated), the textile covering 4 can be provided around the polymeric film 3 by sewing or otherwise sealing the opposing textile fabric layers or webs together separately from the seam 5 made between the opposing polymeric film material webs.

In a still further alternative embodiment, the polymeric film 3 can be provided by sewing the opposing polymeric film material webs together to provide the seam 5 around the energy-absorbing pad 1. In this construction, the seam 5 of the polymeric film 3 will not be air tight, and will include small openings between the opposing film portions which may provide sufficient air permeability to obviate the need of the perforations 8 discussed above. It is contemplated, however, that the polymeric film sheets could be sewn together sufficiently tightly, or using a small enough stitch that the polymeric film 3 still would present adequate water impermeability under most ordinary conditions where water may be encountered. Sewing together the polymeric film portions may be less desirable because of the increased production costs. Furthermore, sewing together the polymeric film sheets may be less reliable than other methods as those described above.

Other alternatives for sealing or bonding the polymeric film sheets together can include gluing to create the desired seam 5. Conventional glues or epoxy sealants well known in the art can be used to seal or bond the top and bottom polymeric film portions together to form seam 5.

The energy-absorbing pad 1 can be a foam that is formed integrally to the polymeric film layer 3. In this embodiment, the pad 1 can be prepared by molding a foam in a mold wherein polymeric film material has been used to coat the interior wall surfaces of the molding chamber. As the foaming composition (mixture of polyols and isocyanate for a polyurethane foam) rises or foams, it will come into contact with the polymeric film material coating or lining the interior walls of the mold. The foam is permitted to cure such that it cures and forms directly to the polymeric film material so that the resulting construction is of pad 1 having an integrally formed polymeric film 3 directly on the surface thereof.

In another embodiment, the polymeric film 3 can be provided onto the surface of the energy-absorbing pad 1 as a chemically deposited layer that is applied directly on the surface of the pad 1 and then allowed or caused to dry or cure to form a water resistant polymeric film. The chemically deposited layer can be provided as an elastomeric coating material that is not yet cured. The elastomeric material can be a thermoset powder coating composition that cures when exposed to heat, less preferably to a combination of heat and radiation. The elastomeric material can be deposited on the pad 1 by any of the well-known or conventional methods such as spraying, brushing, dipping, etc., depending on the state and the viscosity (atomizability) of the coating material. The elastomeric coating can be sprayed on the pad 1 as a thermoset solvent-release liquid or a thermoset powder. Once the elastomeric coating material is applied over the pad 1, it is heated to a temperature sufficient to cure and crosslink the elastomer. Once cured, the elastomeric material effectively encapsulates the pad 1 as a coating on its surface.

It will be understood that in many of the above-described alternative modes of applying a polymeric film 3, it may be necessary to perforate that film to provide the perforations 8 after the film 3 has been formed around or onto the pad 1 to provide the desired air-permeability.

It will be further understood that if the polymeric film 3 is to consist of multiple plies of polymeric material on one or both sides of the pad 1, it may be necessary to adjust the heating/radio frequency time for one of the heat-sealing modes, or otherwise to take this into consideration when effecting a seal such as a seam 5 or other closure method such as sewing.

Figure 4:
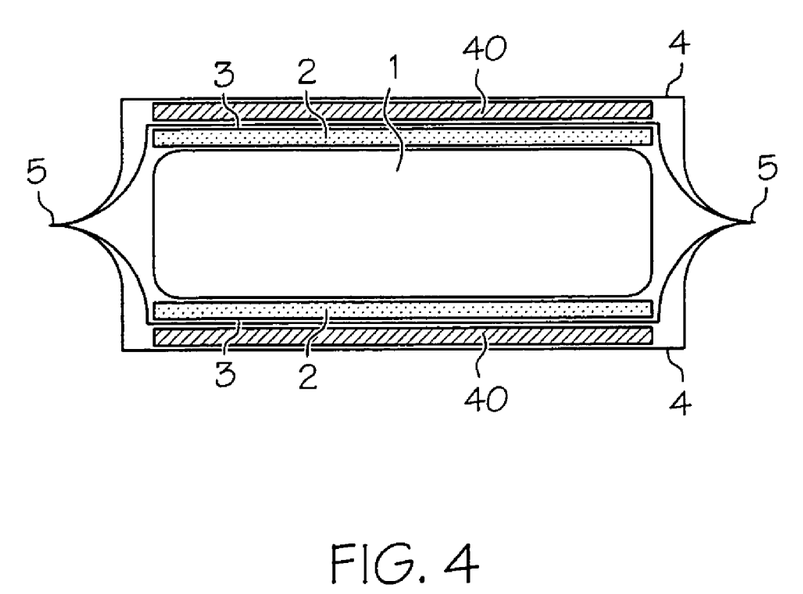
FIG. 4 is a cross-sectional view of the pad structure of FIG. 1, but with additional layers of energy absorbing material 40 provided in between the respective top and bottom portions of the polymeric film 3 and the textile covering 4.

Optionally, as shown in FIG. 4 an additional layer of energy-absorbing material 40 can be positioned adjacent the top and/or bottom surface(s) 12 and/or 14 of the pad 1 in between the associated portions of the polymeric film and textile covering layers 3 and 4. Such a layer(s) if present can be made from the semi-rigid viscoelastic foam described above for the pad 1, and may provide an additional impediment to the penetration of moisture into the main energy absorbing pad 1, e.g. in the unlikely event of a submersion of extended duration or significant depth. In addition, when placed adjacent the bottom surface 14 of the pad 1, such additional foam layer may provide additional comfort or cushioning benefits to the wearer, particularly when used in a helmet that is worn for extended periods. In this embodiment, however, when the layer 40 is intended as a comfort foam to be positioned adjacent the bottom surface 14 of the pad 1, it may be preferable to use a soft, flexible foam instead of a semi-rigid viscoelastic foam for the layer 40.

The pad structure 10 described herein can be used in various applications and protective gear including, but not limited to, safety equipment, combat helmets, athletic helmets, sporting equipment, kneepads, elbow pads, etc. Because the pad structure 10 effectively absorbs the force on an impact, its use can be applied broadly to any application in which it is desirable to protect body parts or equipment, such as electronics, tools, etc. It is even contemplated the pad structures described herein can be used as packing materials for shipment of goods where it is desired to provide protection against a high-speed dynamic impact while in transit.

Further aspects of the invention will become evident through reference to the following example, which is provided by way of illustration and not limitation.

EXAMPLE

A semi-rigid viscoelastic foam pad measuring nominally 3⅜"×2"×¾" was encapsulated within a polyurethane film having nominally the same dimensions as applied. The polyurethane film was composed of Dureflex™PT9400S supplied by on one side of the foam pad, and Dureflex™PT6100S on the other side, which films were joined together around the perimeter of the pad as further explained below. The encapsulated pad was further enclosed within a textile covering, one side of which was made from a pile fabric similar to a Velcro and the other side of which was made from a wicking fabric such as a cotton fabric. To prepare this construction, one ply of Dureflex™PT9400S polyurethane film, 5 mil thick, one ply of Dureflex™PT6100S, 2 mils thick, one ply of Velcro pile fabric and one ply of wicking fabric were die cut to oversized dimensions relative to the pad. The polyurethane film, Velcro and wicking fabric sheets then were then perforated using a 0.005" diameter beveled-point needle. The perforations were made by penetrating in the direction from the surface that was to face away from the pad, through the layers and toward the surface that was to face the pad. The perforations were spaced about ½" apart in the layers.

Then the layers were arranged with the foam pad in a die cavity as follows: the wicking fabric was positioned in the bottom of the die cavity, one ply of 2 mil thick polyurethane film was placed on top of the wicking fabric, the pad was placed on top of the first ply of polyurethane film, one ply of 5 mil thick polyurethane film were placed on top of the pad, and the Velcro pile fabric was placed on top of the construction. A radio frequency was applied to the die, and then the die was clamped shut around the layered construction similarly as illustrated in FIG. 3b to compress the plies of polyurethane film, the wicking fabric and the Velcro fabric together along a pathway around the perimeter of the foam pad. The compressed layers were heated via the radio frequency for a period of up to 5 seconds to create an airtight seal around the perimeter of the pad. The resulting pad structure was removed from the die and extraneous material outside the newly formed seal was cut away.

The encapsulated pad (with the fabric removed) was then weighed to the nearest 0.01 gram prior to being submerged to a depth of six inches in a 25° C. water bath. The encapsulated pad was submerged for a period of 24 hours, after which the encapsulated pad was removed from the water bath and towel dried. The encapsulated pad was then placed on a rack to dry at ambient temperature for 24 hours. After drying, the pads were weighed to the nearest 0.01 gram. The initial weight was deducted from the final weight to determine the weight of water absorbed by the pad. The final weight of the pad was less than 1% greater then that initially measured (i.e. prior to submerging in the water bath). Hence, the perforations in the polymeric film plies did not substantially adversely affect the water impenetrability of that film measured according to the conditions of the test, which were intended to be more stringent (in terms of water contact) than a typical piece of protective gear might encounter in ordinary sport or combat applications Although the above-described embodiments constitute the preferred embodiments, it will be understood that various changes or modifications can be made thereto without departing from the spirit and the scope of the present invention as set forth in the appended claims.

What is claimed is:

1. An energy-absorbing pad structure comprising an energy-absorbing viscoelastic foam pad and a waterproof polymeric film encapsulating said foam pad, and a textile covering encapsulating said polymeric film, said polymeric film containing perforations that inhibit or prevent liquid water from passing through said polymeric film into said foam pad in the absence of a pressure gradient across the film, but permit air to pass through said polymeric film out of said foam pad when the pad structure is subject to a compression event and to pass through said polymeric film into said foam pad following said compression event, said foam pad having a pre-compression shape before the compression event, whereby the foam pad can recover to the pre-compression shape following the compression event, said polymeric film being made from an elastic polymer, wherein the polymer's elasticity contracts the perforations in the polymeric film to resist water penetration through said film.

2. A pad structure according to claim 1, said elastic polymer being an elastic polyurethane.

3. A pad structure according to claim 1, said foam pad having opposite first and second surfaces, said polymeric film comprising a first portion of polymeric film material applied over said first surface, and a second portion of polymeric film material applied over said second surface, said first and second portions of polymeric film material being joined together at a seam around the perimeter of said foam pad.

4. A pad structure according to claim 3, said first and second portions of said polymeric film being joined at said seam by heat-sealing or radio-frequency sealing.

5. A pad structure according to claim 3, said first and second portions of said polymeric film being joined at said seam by sewing.

6. A pad structure according to claim 3, wherein only one of said first and said second portions of polymeric film material is provided with perforations.

7. A pad structure according to claim 3, said first portion of said polymeric film being thicker than said second portion of said polymeric film.

8. A pad structure according to claim 3, said first portion of said polymeric film comprising a plurality of polymeric film plies overlying the entire first surface and at least one more ply than said second portion of said polymeric film overlying the entire second surface.

9. A pad structure according to claim 3, said textile covering comprising a first portion of textile material applied over said first portion of polymeric film material, and a second portion of textile material applied over said second portion of polymeric film material, wherein said first and second portions of textile material are joined together with said first and second portions of polymeric film material at said seam around the perimeter of said pad.

10. A pad structure according to claim 1, said polymer film being bonded to the foam pad.

11. A pad structure according to claim 10, said polymer film being bonded to the foam pad via an intermediate adhesive layer.

12. A pad structure according to claim 1, said viscoelastic foam pad being made from a semi-rigid viscoelastic foam.

13. A pad structure according to claim 12, said semi-rigid viscoelastic foam being formulated from a polyol composition comprising at least one propylene oxide-extended amine-based polyether polyol that has substantially no ethylene oxide extension units, and at least one filled or unfilled non-amine-based polyether polyol, said polyol composition being combined with an isocyanate composition at an index of 60-130 to provide said semi-rigid viscoelastic foam.

14. A pad structure according to claim 12, wherein after compression of said semi-rigid viscoelastic foam to 50% its original height, said foam substantially recovers to its initial shape in from 3 to 120 seconds.

15. A pad structure according to claim 1, wherein the foam pad measuring nominally 3 3/8"×2"×3/4" and said encapsulating polymeric film having nominally the same dimensions, and wherein the polymeric film allows less than one percent by weight of water, compared to the initial weight of the foam pad and the polymeric film, to enter the foam pad through said perforations following submersion of the pad structure in six inches of water for 24 hours.

16. A pad structure according to claim 1, said polymeric film layer being laminated to said textile layer.

17. A pad structure according to claim 1, further comprising a layer of energy-absorbing foam disposed in between adjacent portions of said polymeric film and said textile covering.

18. A pad structure according to claim 1, further comprising a layer of soft, flexible foam disposed in between adjacent portions of said polymeric film and said textile covering.

19. A pad structure according to claim 1, said foam pad comprising a first layer of foam joined to a second layer of foam, the foam of the first layer has a higher modulus than the foam of the second layer.

20. A pad structure according to claim 3, said foam pad comprising a first layer of foam joined to a second layer of foam, the foam of the first layer has a higher modulus than the foam of the second layer.

21. A pad structure according to claim 4, said textile covering comprising a first portion of textile material applied over said first portion of polymeric film material, and a second portion of textile material applied over said second portion of polymeric film material, wherein said first and second portions of textile material are joined together with said first and second portions of polymeric film material at said seam by having been permeated with and absorbing a portion of polymeric material from said film in a softened state followed by re-hardening or solidification of said polymeric material.

22. A pad structure according to claim 1, said textile covering comprising a first portion of textile material comprising a fabric adapted to secure said pad structure to a protective shell via a hook-and-pile fastener mechanism.

23. A pad structure according to claim 22, said textile covering further comprising a second portion of textile material that is effective to absorb and wick moisture from a wearer's body part in contact with said second portion of textile material during use.

24. A helmet comprising a helmet shell and a pad structure according to claim 1 secured to an inner surface of the helmet shell.

25. A helmet according to claim 24, further comprising a plurality of said pad structures secured to said inner surface of said helmet shell.

26. A helmet according to claim 24, said textile covering comprising a first portion of textile material comprising a fabric adapted to secure said pad structure to the inner surface of said helmet shell via a hook-and-pile fastener mechanism.

27. A helmet according to claim 26, said textile covering further comprising a second portion of textile material comprising a fabric that is effective to absorb and wick moisture from a wearer's body part in contact with said second portion of textile material during use.

28. A pad structure according to claim 1, said foam pad being an open-cell foam.

29. A helmet according to claim 24, said foam pad being an open-cell foam.

30. A helmet according to claim 24, said foam pad comprising a first layer of foam joined to a second layer of foam, the foam of the first layer has a higher modulus than the foam of the second layer.

* * * * *